(12) United States Patent
Song et al.

(10) Patent No.: US 11,924,065 B2
(45) Date of Patent: Mar. 5, 2024

(54) METHOD AND ELECTRONIC DEVICE FOR PLACING MICRO NETWORK FUNCTION

(71) Applicants: Samsung Electronics Co., Ltd., Suwon-si (KR); Korea University Research and Business Foundation, Seoul (KR)

(72) Inventors: Seongkyu Song, Suwon-si (KR); Joonwoo Kim, Seoul (KR); Sangheon Pack, Seoul (KR); Jaewook Lee, Seoul (KR); Taeyun Kim, Seoul (KR); Youbin Jeon, Seoul (KR); Jungsoo Jung, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 268 days.

(21) Appl. No.: 17/374,716

(22) Filed: Jul. 13, 2021

(65) Prior Publication Data
US 2022/0021589 A1    Jan. 20, 2022

(30) Foreign Application Priority Data

Jul. 14, 2020    (KR) .......................... 10-2020-0087135

(51) Int. Cl.
*H04L 41/5041* (2022.01)
*H04L 41/0806* (2022.01)
*H04L 41/14* (2022.01)
*H04L 41/147* (2022.01)
(Continued)

(52) U.S. Cl.
CPC ...... *H04L 41/5045* (2013.01); *H04L 41/0806* (2013.01); *H04L 41/145* (2013.01); *H04L 41/147* (2013.01); *H04W 24/02* (2013.01); *H04W 88/18* (2013.01)

(58) Field of Classification Search
None
See application file for complete search history.

(56) References Cited

U.S. PATENT DOCUMENTS

| 9,439,243 | B2 | 9/2016 | Liu et al. |
| 2020/0084836 | A1 | 3/2020 | Holma et al. |
| 2020/0322821 | A1* | 10/2020 | Lee ....................... H04W 24/02 |

(Continued)

FOREIGN PATENT DOCUMENTS

| KR | 10-1501190 B1 | 3/2015 |
| KR | 10-2019-0088066 A | 7/2019 |

OTHER PUBLICATIONS

Cho et al., "MobileStream: A Scalable, Programmable and Evolvable Mobile Core Control Plane Platform", CoNEXT'18, Dec. 4-7, 2018, 14 pages.

(Continued)

*Primary Examiner* — Ajit Patel

(57) ABSTRACT

A method, performed by an electronic device, of placing a micro network function, includes: determining at least one micro network function used for a service; predicting control signaling overhead of at least one cell including at least one cell edge cloud, based on a history of control signaling overhead of the at least one cell; and placing the at least one micro network function in the at least one cell edge cloud, based on the predicted control signaling overhead of the at least one cell.

20 Claims, 10 Drawing Sheets

(51) Int. Cl.
H04W 24/02 (2009.01)
H04W 88/18 (2009.01)

(56) References Cited

U.S. PATENT DOCUMENTS

2020/0328944 A1* 10/2020 Zhang ................... H04L 47/722
2021/0144071 A1* 5/2021 Young ................ H04L 41/0893

OTHER PUBLICATIONS

Moradi et al., "SoftBox: A Customizable, Low-Latency, and Scalable 5G Core Network Architecture", IEEE Journal on Selected Areas in Communications, vol. 36, No. 3, Mar. 2018, 20 pages.
Solozabal et al., "Virtual Network Function placement optimization with Deep Reinforcement Learning", IEEE Journal on Selected Areas in Communications, Dec. 2019, 13 pages.

* cited by examiner

METHOD AND ELECTRONIC DEVICE FOR PLACING MICRO NETWORK FUNCTION

CROSS-REFERENCE TO RELATED APPLICATION

This application is based on and claims priority under 35 U.S.C. § 119 to Korean Patent Application No. 10-2020-0087135 filed on Jul. 14, 2020 in the Korean Intellectual Property Office, the disclosure of which is incorporated by reference herein in its entirety.

BACKGROUND

1. Field

The disclosure relates to a method and electronic device for placing a micro network function.

2. Description of the Related Art

A network function (NF) of an evolved packet core (EPC) may include dedicated server-based entities. However, NFs included in a 5th generation core (5GC) may be present in the form of a virtual machine in a general-purpose server, via virtualization. In the future, NFs of a mobile core network may be further defined as micro network functions optimally customized to individual services. Also, it is expected that a mobile core network may be configured as a lightweight core network by placing the micro network functions in a cell included in a cell edge cloud, to satisfy requirements of individual services.

In industry, standards groups, and academia, the concept of a lightweight core network via customized micro network functions is being discussed. Industry defines a micro service-based micro network function, proposes a scenario in which micro network functions are placed in different private/public clouds to form a mobile core network, and discusses a service model for providing a business operator-dedicated network called a non-public network (NPN) by arranging only required NFs in a private cloud. In addition, studies are being conducted on defining customized NFs, such as the micro network functions, and placing the customized NFs in a heterogeneous cloud to provide a function of the mobile core network.

To implement a lightweight core network via a customized micro network function, a method for placing a micro network function in a cell edge cloud suitable for an environment of a mobile network is required to actually apply the micro network function to the mobile network.

SUMMARY

Provided are a method and electronic device for placing a micro network function.

Additional aspects will be set forth in part in the description which follows and, in part, will be apparent from the description, or may be learned by practice of the presented embodiments of the disclosure.

According to an embodiment of the disclosure, a method, performed by an electronic device, of placing a micro network function, includes: determining at least one micro network function used for a service; predicting control signaling overhead of at least one cell including at least one cell edge cloud, based on a history of control signaling overhead of the at least one cell; and placing the at least one micro network function in the at least one cell edge cloud, based on the predicted control signaling overhead of the at least one cell.

The at least one micro network function may include at least one of: a specific network function (S-NF) used for a specific service; or a common network function (C-NF) commonly used for a service.

The predicting of the control signaling overhead of the at least one cell may include predicting the control signaling overhead via a control signaling overhead prediction model trained to predict a control signaling overhead, based on the history of the control signaling overhead of the at least one cell according to a placement time interval.

The placing of the at least one micro network function may include placing the at least one micro network function, based on at least one of an available resource condition or a latency condition of the at least one cell.

The placing of the at least one micro network function may include placing the at least one micro network function, based on a placement cost of the at least one micro network function.

The placement cost of the at least one micro network function may include at least one of an installation cost for installing the at least one micro network function in the at least one cell edge cloud or an operation cost for operating the at least one micro network function.

The placing of the at least one micro network function may include: selecting at least one cell edge cloud in which placement of a micro network function is to be different from current placement; and placing the at least one micro network function in the selected at least one cell edge cloud.

The at least one cell edge cloud may include at least one Internet of things (IoT) gateway, and the placing of the at least one micro network function in the at least one cell edge cloud may include placing the at least one micro network function in the at least one IoT gateway.

The method may further include: requesting a 5th generation core (5GC) network for control signaling data analytics; and receiving the control signaling data analytics from the 5GC network, wherein the predicting of the control signaling overhead of the at least one cell may include predicting the control signaling overhead of the at least one cell, based on the received control signaling data analytics, and the placing of the at least one micro network function may include transmitting, to the 5GC network, information about placement of the at least one micro network function.

According to another embodiment of the disclosure, an electronic device includes: a memory; a transceiver; and at least one processor configured to: determine at least one micro network function used for a service; predict control signaling overhead of at least one cell including at least one cell edge cloud, based on a history of control signaling overhead of the at least one cell; and place the at least one micro network function in the at least one cell edge cloud, based on the predicted control signaling overhead of the at least one cell.

The at least one micro network function may include at least one of: a specific network function (S-NF) used for a specific service; or a common network function (C-NF) commonly used for a service.

The at least one processor may be further configured to predict the control signaling overhead via a control signaling overhead prediction model trained to predict a control signaling overhead, based on the history of the control signaling overhead of the at least one cell according to a placement time interval.

The at least one processor may be further configured to place the at least one micro network function, based on at least one of an available resource condition or a latency condition of the at least one cell.

The at least one processor may be further configured to place the at least one micro network function, based on a placement cost of the at least one micro network function.

The placement cost of the at least one micro network function may include at least one of an installation cost for installing the at least one micro network function in the at least one cell edge cloud or an operation cost for operating the at least one micro network function.

The at least one processor may be further configured to: select at least one cell edge cloud in which placement of a micro network function is to be different from current placement; and place the at least one micro network function in the selected at least one cell edge cloud.

The at least one cell edge cloud may include at least one Internet of things (IoT) gateway, and the at least one processor is further configured to place the at least one micro network function in the at least one IoT gateway.

The at least one processor may be further configured to: request a 5th generation core (5GC) network for control signaling data analytics; receive the control signaling data analytics from the 5GC network; predict the control signaling overhead of the at least one cell, based on the received control signaling data analytics; and transmit, to the 5GC network, information about placement of the at least one micro network function.

According to another embodiment of the disclosure, a computer-readable recording medium has recorded thereon a program for executing, by an electronic device, the method.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
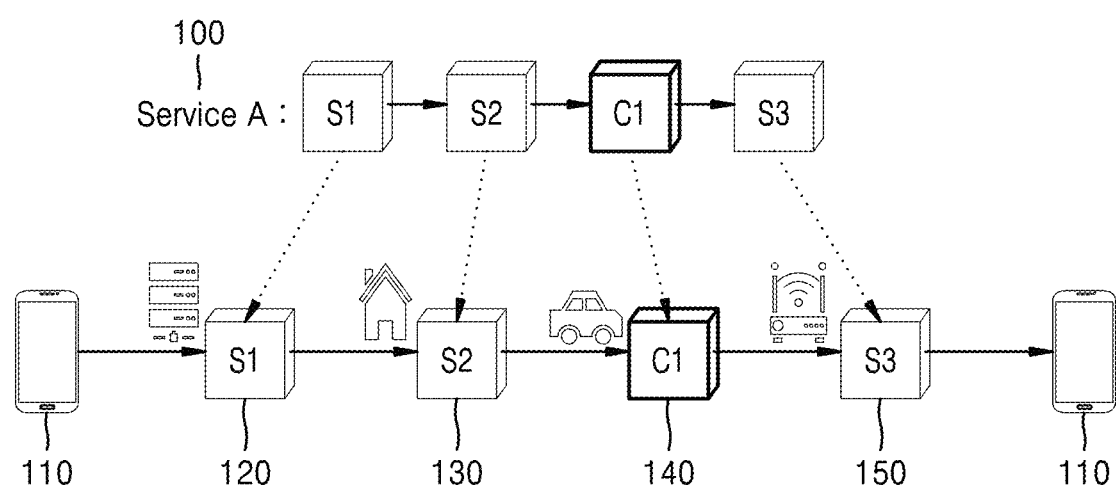
FIG. 1 illustrates a diagram for describing an example of providing a service via a micro network function, according to an embodiment of the disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, embodiments of the disclosure will be described with reference to accompanying drawings.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure.

When a part "includes" or "comprises" an element, unless there is a particular description contrary thereto, the part may further include other elements, not excluding the other elements.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s).

The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s).

The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

FIG. 1 illustrates a diagram for describing an example of providing a service via a micro network function, according to an embodiment of the disclosure.

The micro network function denotes a function of a core customized to an individual service. The micro network function includes a specific network function (S-NF) used to provide a specific service or a common network function (C-NF) commonly used for a service.

According to an embodiment of the disclosure, the S-NF may include a power control micro network function reflecting characteristics of an Internet of things (IoT) device, a session management micro network function, a buffer management micro network function, or a quality of service (QoS) management micro network function.

According to an embodiment of the disclosure, the C-NF may include a network access control micro network function, a network registration micro network function, a connection management micro network function, a non-3GPP access control micro network function, an authentication and authorization micro network function, or a charging management micro network function.

A core service is performed by a combination of micro network functions. For example, a service A 100 requested by a user equipment (UE) 110 may be performed by a combination of an S-NF 1 (S1) 120, an S-NF 2 (S2) 130, a C-NF 1 (C1) 140, and an S-NF 3 (S3) 150.

Figure 2:
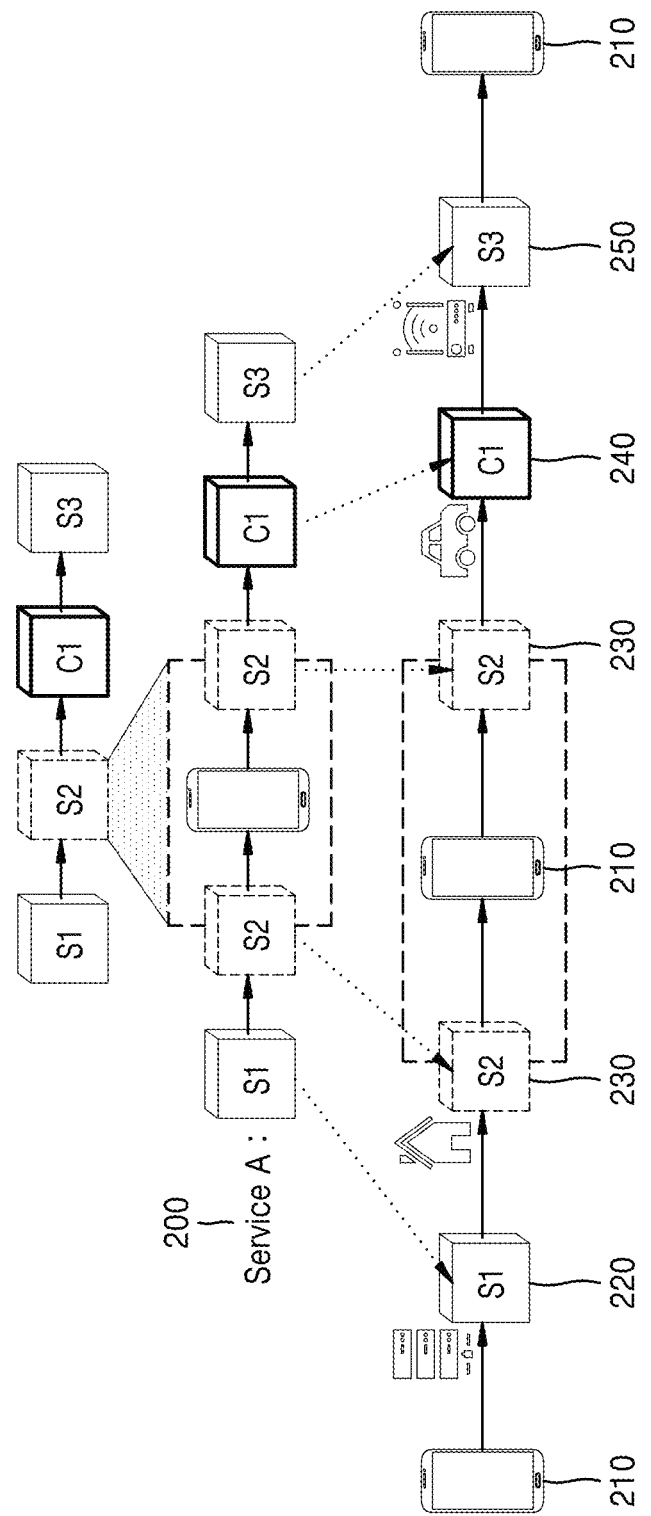
FIG. 2 illustrates a diagram for describing an example of providing a service via a micro network function, according to another embodiment of the disclosure.

FIG. 2 illustrates a diagram for describing an example of providing a service via a micro network function, according to another embodiment of the disclosure.

Referring to FIG. 2, a service A 200 requested by a UE 210 may be performed by a combination of an S1 220, an S2 230, a C1 240, and an S3 250.

According to an embodiment of the disclosure, a micro network function may require a control signaling in the UE 210 before a control signaling is transmitted to a following micro network function. For example, the S2 230 requires a control signaling with the UE 210 before transmitting a control signaling to the C1 240.

Here, the control signaling denotes a control signaling of a backhaul. Accordingly, control signaling overhead may be determined according to a location of the UE 210 and a cell edge cloud where a micro network function is installed.

Figure 3:
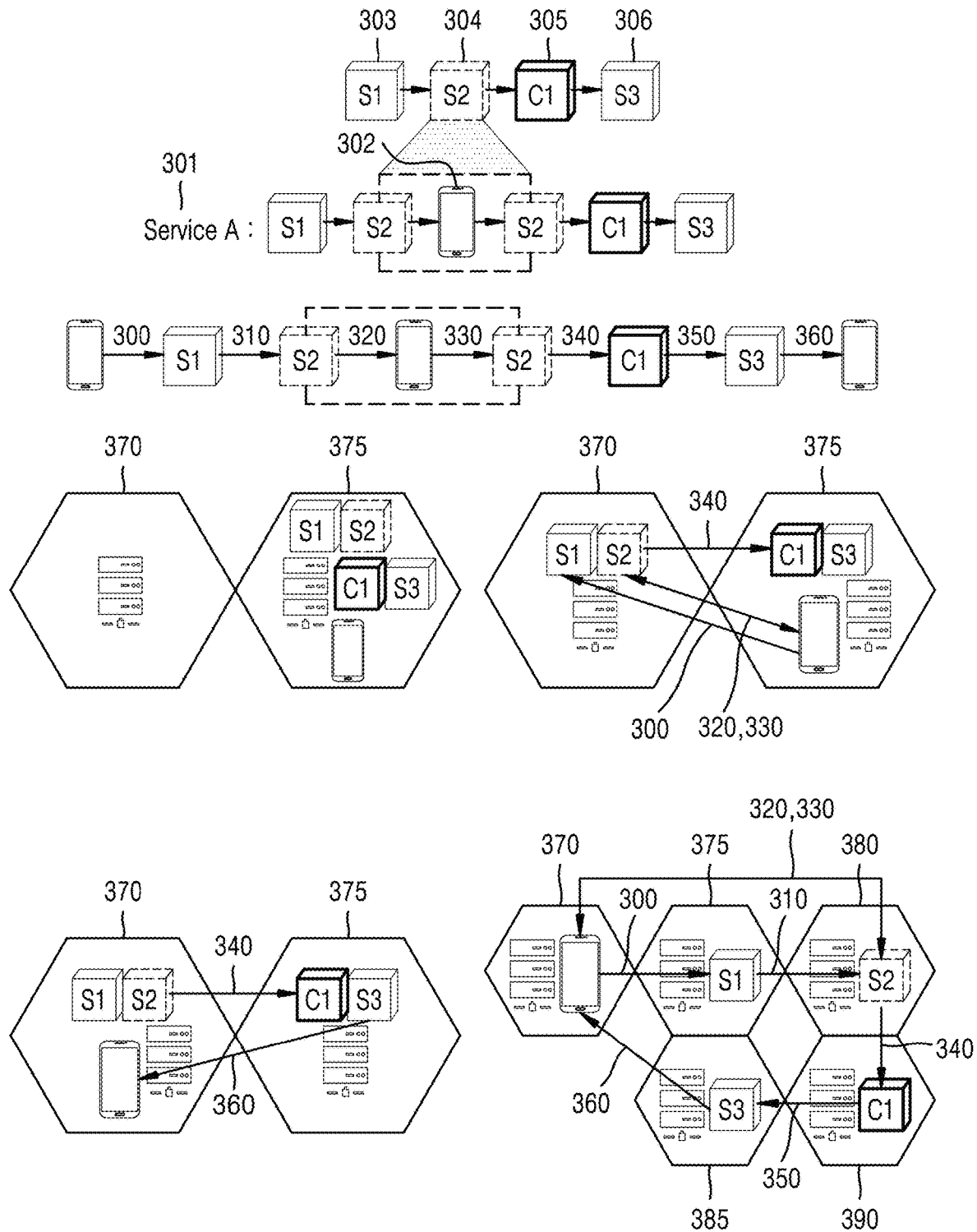
FIG. 3 illustrates a diagram for describing control signaling overhead that occurs according to an embodiment of the disclosure.

FIG. 3 illustrates a diagram for describing control signaling overhead that occurs according to an embodiment of the disclosure.

Referring to FIG. 3, a service A 301 requested by a UE 302 may be performed by a combination of an S1 303, an S2 304, a C1 305, and an S3 306. The S2 304 requires a control signaling with the UE 302 before transmitting a control signaling to the C1 305.

Control signaling overhead may be determined according to a location of the UE 302 and cell edge clouds 370, 375, 380, 385, and 390 where micro network functions are installed. For example, when the UE 302, the S1 303, the S2 304, the C1 305, and the S3 306 are located in the cell edge cloud 375, the control signaling overhead is zero (0) because there is no control signaling.

As another example, when the S1 303 and the S2 304 are located in the cell edge cloud 370, and the UE 302, the C1 305, and the S3 306 are located in the cell edge cloud 375, the control signaling overhead is 4 because control signalings 300, 320, 330, and 340 are generated.

As another example, when the UE 302, the S1 303, and the S2 304 are located in the cell edge cloud 370, and the C1 305 and the S3 306 are located in the cell edge cloud 375, the control signaling overhead is 2 because the control signalings 340 and 360 are generated.

As another example, when the UE 302 is located in the cell edge cloud 370, the S1 303 is located in the cell edge cloud 375, the S2 304 is located in the cell edge cloud 380, the C1 305 is located in the cell edge cloud 390, and the S3 306 is located in the cell edge cloud 385, the control signaling overhead is 7 because the control signalings 300, 310, 320, 330, 340, 350, and 360 are generated.

As such, the control signaling overhead is determined according to the location of the UE 302 and the cell edge clouds 370, 375, 380, 385, and 390 where micro network functions are installed. Accordingly, a micro network function may be placed in a cell edge cloud where control signaling overhead is optimized.

Figure 4:
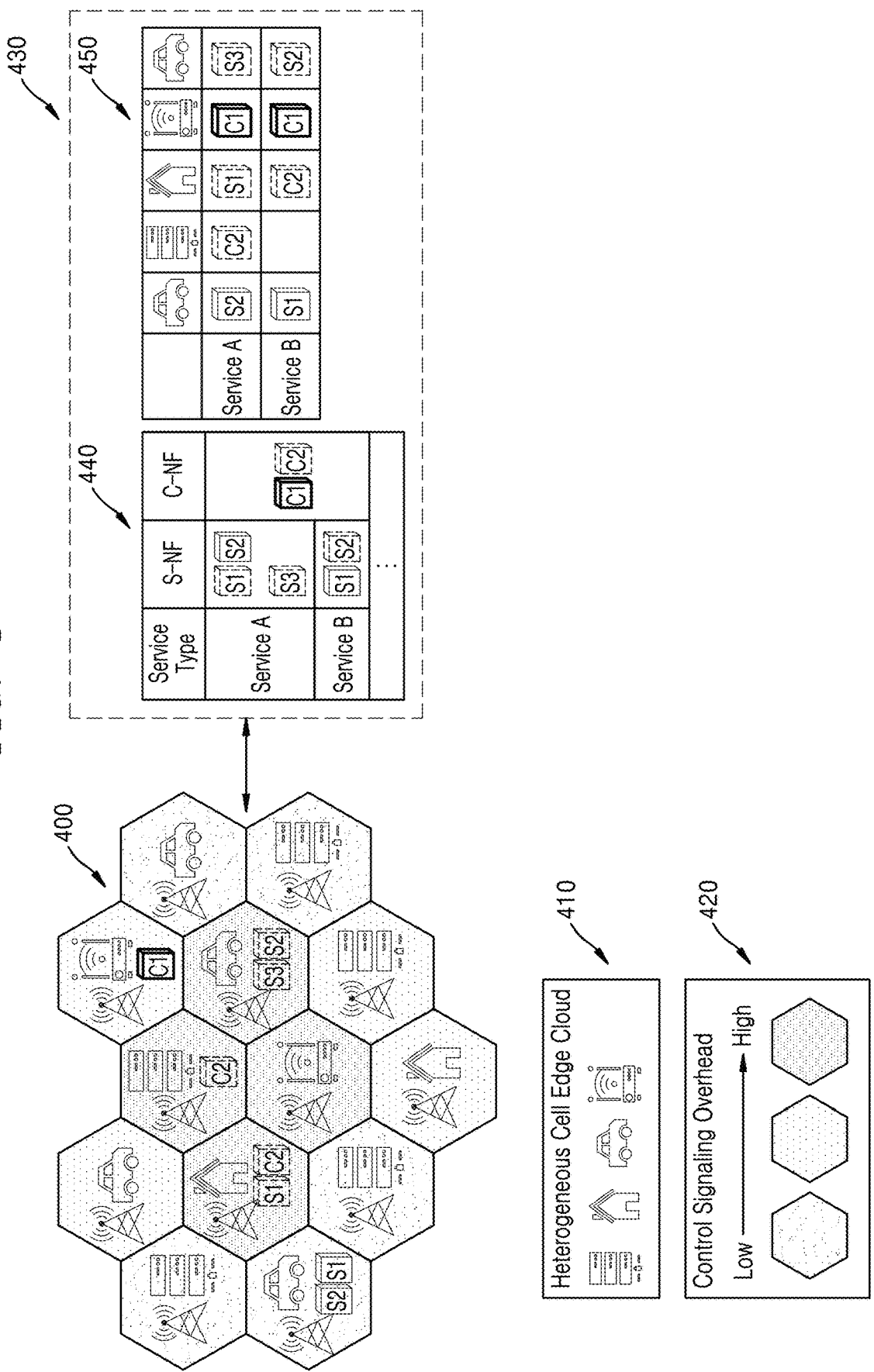
FIG. 4 illustrates a diagram for describing an overall architecture of a placement system, according to an embodiment of the disclosure.

FIG. 4 illustrates a diagram for describing an overall architecture of a placement system, according to an embodiment of the disclosure.

At least one cell 400 may include at least one cell edge cloud 410. Control signaling overhead 420 of the at least one cell 400 may vary depending on a control signaling.

According to an embodiment of the disclosure, the cell edge cloud 410 may include a cooperative IoT gateway. The cooperative IoT gateway will be described in detail below with reference to FIG. 6.

An electronic device 430 may include combination information 440 of micro network functions required to provide a core service. For example, the combination information 440 may be information indicating that a service A requested by a UE is performed by a combination of an S1, an S2, an S3, a C1, and a C-NF 2 (C2).

As another example, the combination information 440 may be information indicating that a service B requested by the UE is performed by a combination of an S1, an S2, a C1, and a C2.

The electronic device 430 may place the micro network functions in the cell edge cloud 410 included in the cell 400, as indicated by reference numeral 450. An operation by which the electronic device 430 places the micro network functions in the cell edge cloud 410 will be described in detail below with reference to FIGS. 5 and 7.

According to an embodiment of the disclosure, the electronic device 430 may place the micro network function in the cell edge cloud 410 when an event occurs, for example, when there is a request of an external entity.

According to another embodiment of the disclosure, the electronic device 430 may place or re-place the micro network function in the cell edge cloud 410 on a regular cycle.

Figure 5:
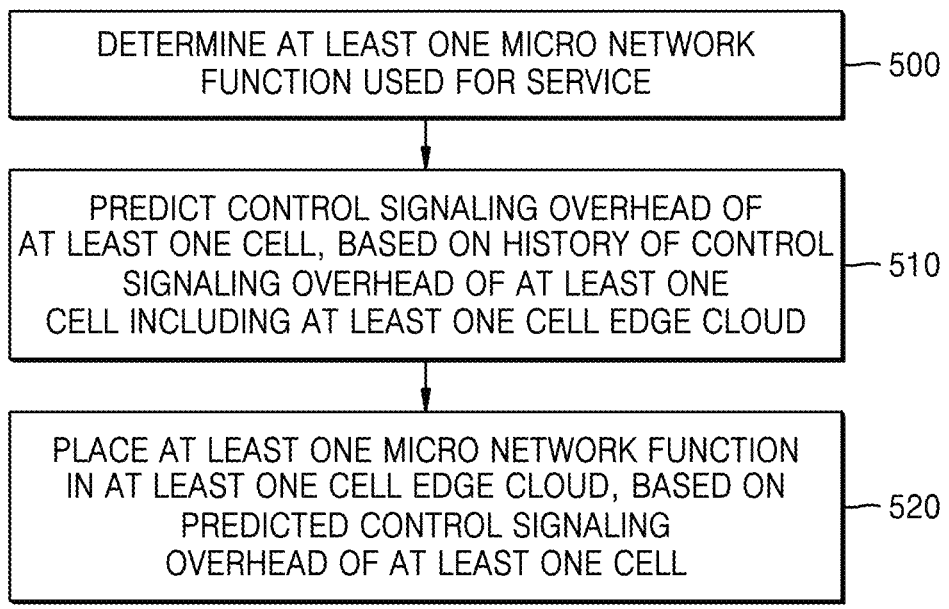
FIG. 5 illustrates a flowchart of a method, performed by an electronic device, of placing a micro network function, according to an embodiment of the disclosure.

FIG. 5 illustrates a flowchart of a method, performed by an electronic device, of placing a micro network function, according to an embodiment of the disclosure.

The micro network function includes an S-NF used to provide a specific service or a C-NF commonly used for a service. A core service is performed by a combination of the micro network functions. Control signaling overhead may be determined according to a location of a UE and a cell edge cloud where the micro network function is installed.

In operation 500, the electronic device may determine at least one micro network function used for a service. For example, it may be determined that a service A requested by the UE uses a combination of an S1, an S2, an S3, a C1, and a C2.

In operation 510, the electronic device may predict control signaling overhead of at least one cell, based on a history of control signaling overhead of the at least one cell including at least one cell edge cloud.

According to an embodiment of the disclosure, the history of the control signaling overhead of the at least one cell may include control signaling overhead generated in the at least one cell for each set placement time interval.

According to another embodiment of the disclosure, the history of the control signaling overhead of the at least one cell may include control signaling overhead generated in the at least one cell according to occurrence of an event, for example, for each request of an external entity.

According to an embodiment of the disclosure, the predicting of the control signaling overhead of the at least one cell may be performed via a control signaling overhead prediction model trained based on the history of the control signaling overhead of the at least one cell. The training of the control signaling overhead prediction model, based on the history, and applying of the trained control signaling overhead prediction model may be performed via a well-known deep leaning technology.

In operation 520, the electronic device may place the at least one micro network function in the at least one cell edge cloud, based on the predicted control signaling overhead of the at least one cell.

According to an embodiment of the disclosure, the placing of the at least one micro network function may be performed based on at least one of an available resource condition or a latency condition of the at least one cell. For example, when an available resource of the cell is zero (0), the micro network function may not be placed in a corresponding cell edge cloud. As another example, when the service requires minimum latency, the micro network function may allow the next router for moving (hopping) from all cells to a destination target network, to be placed within a certain range, i.e., within a certain hop.

According to an embodiment of the disclosure, the placing of the at least one micro network function may be performed based on a placement cost of the at least one micro network function. Detailed operations will be described with reference to FIG. 7.

According to an embodiment of the disclosure, the placement cost of the at least one micro network function includes an installation cost for installing the at least one micro network function in the at least one cell edge cloud or an operation cost for operating the at least one micro network function.

In general, the operation cost of the micro network function may be relatively lower than the installation cost of the micro network function. The installation cost, i.e., a cost for installing the micro network function in a cell edge cloud different from an existing cell edge cloud, may be reduced by placing the micro network function, based on the predicted control signaling overhead of the cell.

Figure 6:
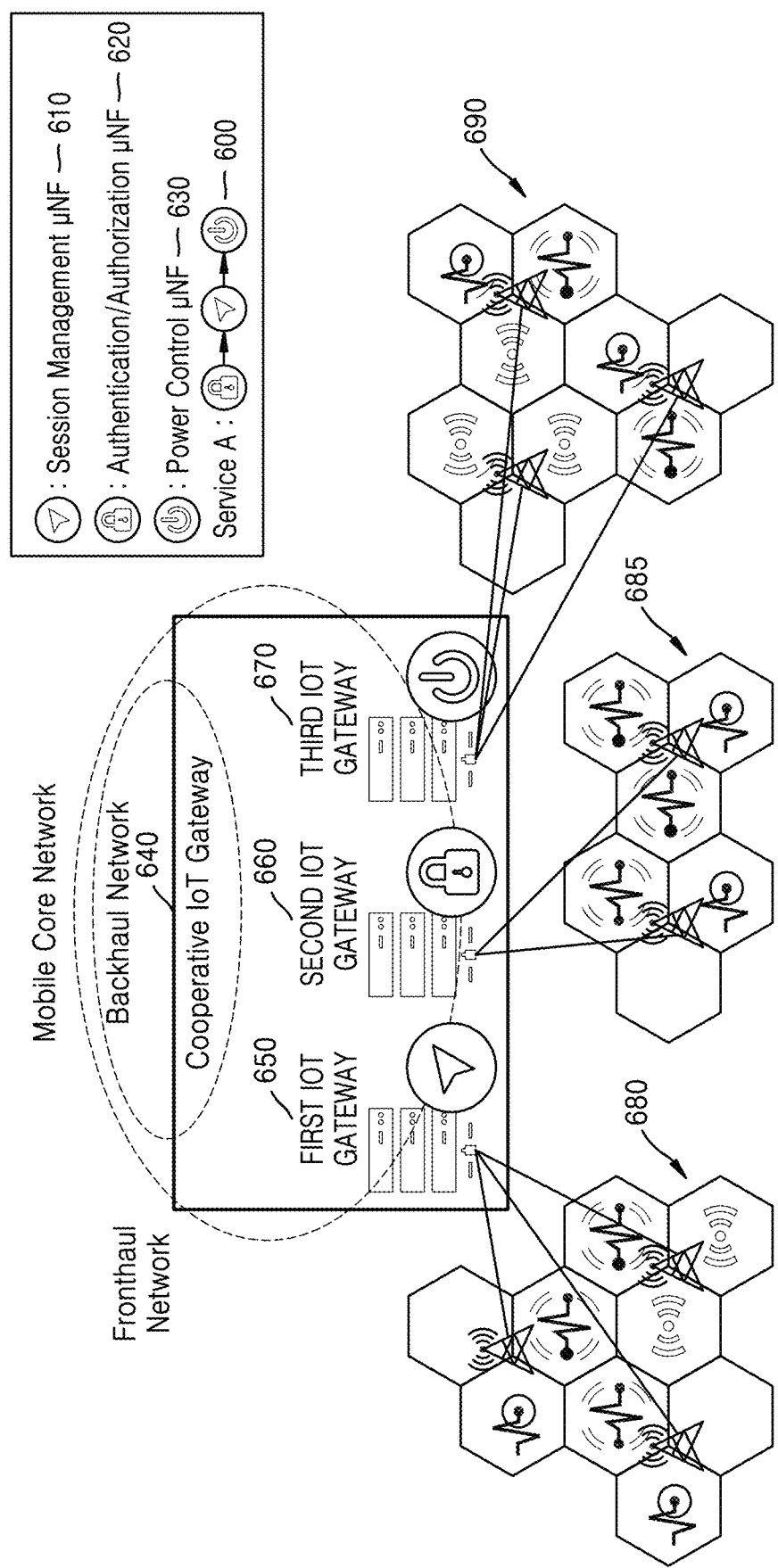
FIG. 6 illustrates a diagram for describing an Internet of things (IoT) gateway according to an embodiment of the disclosure.

FIG. 6 illustrates a diagram for describing an IoT gateway according to an embodiment of the disclosure.

Referring to FIG. 6, a service A 600 requested by IoT devices 680, 685, and 690 may be performed by a combination of an authentication and authorization micro network function 620, a session management micro network function 610, and a power control micro network function 630.

A 5th generation (5G) system may configure a massive machine type communication (mMTC) scenario supporting a plurality of MTC terminals as one vertical service. A 5G core (5GC) network only supports a separate virtual local area network (LAN) based on network slicing for mMTC, and a function of the 5GC network considering characteristics of an IoT device is insufficient. Also, a central unit (CU) and edge cloud physically adjacent to the IoT device have limited computing resources.

Accordingly, a cooperative IoT gateway 640, in which the session management micro network function 610, the authentication and authorization micro network functions 620, and the power control micro network function 630, which are customized to an IoT scenario, are distributed in different first through third IoT gateways 650, 660, and 670, and a service is provided to the IoT devices 680, 685, and 690 via association of the session management micro network function 610, the authentication and authorization micro network functions 620, and the power control micro network function 630, is required.

The cooperative IoT gateway 640 includes the first through third IoT gateways 650, 660, and 670. In this case, the session management micro network function 610 may be placed in the first IoT gateway 650, the authentication and authorization micro network function 620 may be placed in the second IoT gateway 660, and the power control micro network function 630 may be placed in the third IoT gateway 670.

The first IoT gateway 650 may provide the service A 600 to the IoT devices 680 that are physically adjacent to the first IoT gateway 650. According to an embodiment of the disclosure, the first IoT gateway 650 may be connected to the second IoT gateway 660 and the third IoT gateway 670. Accordingly, the first IoT gateway 650 may provide, to the IoT devices 680, not only the session management micro network function 610, but also the authentication and authorization micro network function 620 and the power control micro network function 630.

Similarly, the second IoT gateway 660 and the third IoT gateway 670 may provide the service A 600 to the IoT devices 685 and 690 physically adjacent to the second IoT gateway 660 and third IoT gateway 670, respectively.

Because an IoT gateway (for example, the first IoT gateway 650) is able to provide, to the IoT devices 680, not only a micro network function placed therein, but also a micro network function placed in an adjacent IoT gateway (for example, the second IoT gateway 660 or third IoT gateway 670), it is not required to place a micro network function again every time in the first through third IoT gateways 650, 660, and 670. Accordingly, a resource may be efficiently used in terms of an entire network.

Figure 7:
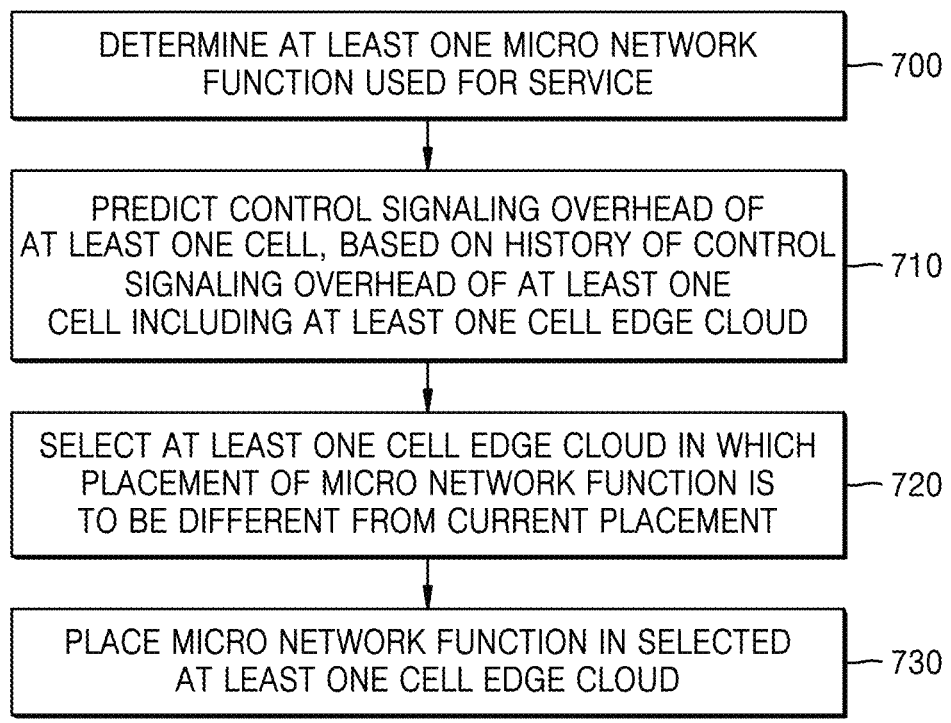
FIG. 7 illustrates a flowchart of a method, performed by an electronic device, of placing a micro network function, according to another embodiment of the disclosure.

FIG. 7 illustrates a flowchart of a method, performed by an electronic device, of placing a micro network function, according to another embodiment of the disclosure.

The micro network function includes an S-NF used to provide a specific service or a C-NF commonly used for a service. A core service is performed by a combination of micro network functions. Control signaling overhead may be determined according to a location of a UE and a cell edge cloud where the micro network function is installed.

In operation 700, the electronic device may determine at least one micro network function used for a service. For example, it may be determined that a service A requested by the UE uses a combination of an S1, an S2, an S3, a C1, and a C2.

In operation 710, the electronic device may predict control signaling overhead of at least one cell, based on a history of control signaling overhead of the at least one cell including at least one cell edge cloud.

In operation 720, the electronic device may select at least one cell edge cloud in which placement of a micro network function is to be different from current placement.

According to an embodiment of the disclosure, the selecting of the at least one cell edge cloud may be performed by a deep reinforcement learning (DRL)-based model.

$$\text{State } s=[w_1, w_2, \ldots, w_{N-1}, w_N] \quad \text{[Equation 1]}$$

$w_N$ denotes the number of micro network functions installable in an Nth cell edge cloud, based on a current time point.

An action in DRL may be represented as Equation 2 below.

$$\text{Action } a \subset \{e_1, e_2, \ldots, e_{N-1}, e_N\} \quad \text{[Equation 2]}$$

$e_N$ denotes that placement of a micro network function of the Nth cell edge cloud is different from current placement. For example, when there are 3 cell edge clouds and Action $a=\{e_1, e_3\}$, placement of micro network functions of first and third cell edge clouds is different from the current placement. On the other hand, placement of a micro network function of a second cell edge cloud is maintained to be the same as the current placement.

The action is selected via an Epsilon-greedy (E-greedy) method, and a reward is represented by Equation 3 below.

$$\text{Reward } r = *-\alpha_1 * F - \alpha_2 * C, \alpha_1 + \alpha_2 = 1 \quad \text{[Equation 3]}$$

F denotes predicted control signaling overhead of at least one cell and C denotes a placement cost of a micro network function.

As described above, the placement cost of the at least one micro network function includes an installation cost for installing the at least one micro network function in the at least one cell edge cloud or an operation cost for operating the at least one micro network function.

A Q-value is updated via deep Q-network (DQN) that is a well-known technology. Accordingly, the E-greedy method may select, via gradual learning, an optimum action based on a current state, the predicted control signaling overhead, and the placement cost of the micro network function, i.e., the cell edge cloud in which the placement of the micro network function is different from the current placement.

As such, the action denotes selecting of the cell edge cloud in which the placement of the micro network function is different from the current placement. In other words, the action does not denote selecting of a cell edge cloud in which placement of a micro network function is different from current placement and placing the micro network function in the selected cell edge cloud.

Accordingly, an action space is reduced and slow convergence during a learning process may be prevented.

In operation 730, the electronic device may place the micro network function in the selected at least one cell edge cloud.

As described above, the placing of the at least one micro network function may be performed based on at least one of an available resource condition or a latency condition of the at least one cell.

According to another embodiment of the disclosure, the placing of the micro network function may be performed according to Equation 4 below.

$$\text{Object Function} = \alpha_1 * F + \alpha_2 * C, \alpha_1 + \alpha_2 = 1 \quad \text{[Equation 4]}$$

F denotes predicted control signaling overhead of at least one cell and C denotes a placement cost of a micro network function.

The placing of the micro network function may be performed such that an object function has a smallest value. The object function may be used as a reward during learning.

Figure 8:
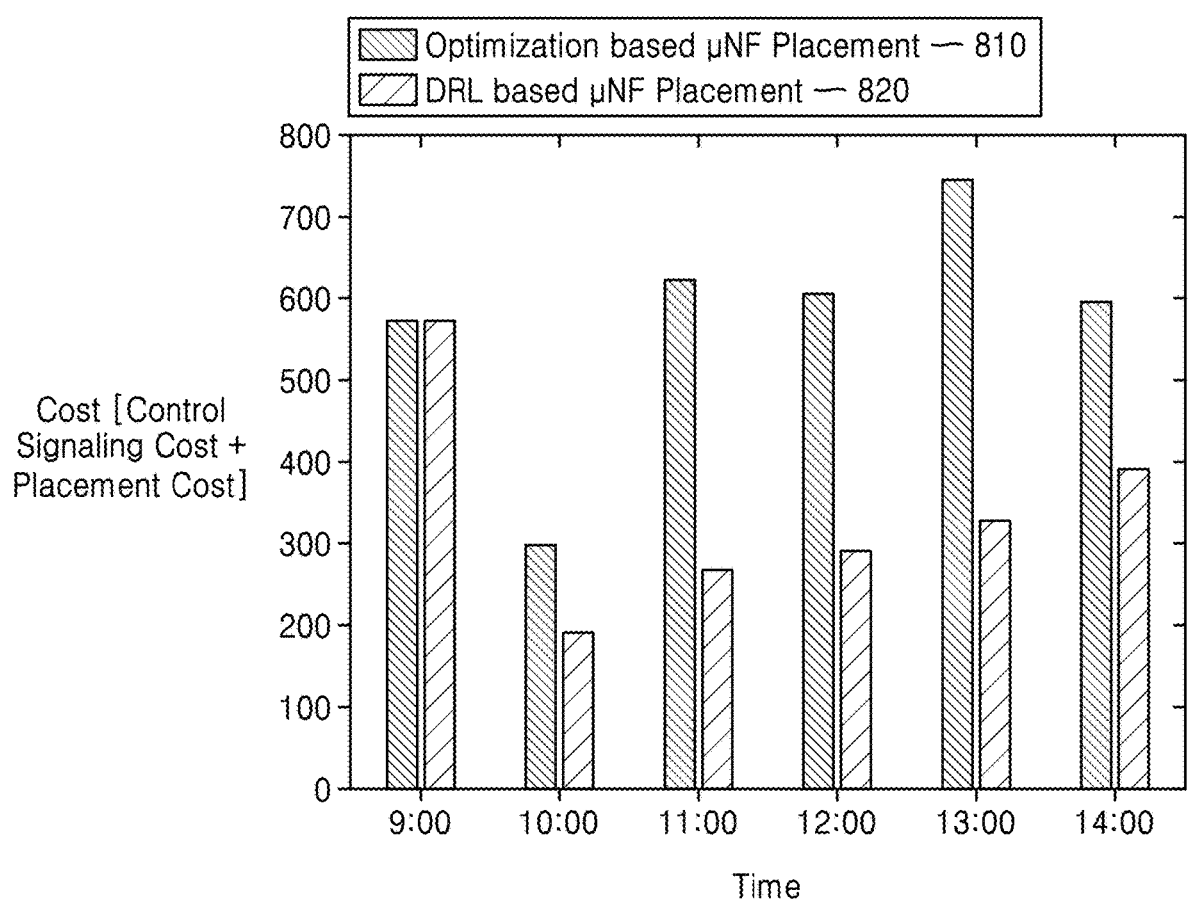
FIG. 8 illustrates a diagram for describing the performance of a method, performed by an electronic device, of placing a micro network function, according to an embodiment of the disclosure.

FIG. 8 illustrates a diagram for describing a performance of a method, performed by an electronic device, of placing a micro network function, according to an embodiment of the disclosure.

In optimization based micro network function placement 810, micro network functions are placed again in all cell edge clouds such that an object function has a smallest value, regardless of DRL-based learning. In other words, in the optimization based micro network function placement 810, a cell edge cloud in which placement of a micro network function is different from current placement is always selected as the all cell edge clouds.

In the optimization based micro network function placement 810, the micro network function is placed in the cell edge cloud, only considering current control signaling overhead. For example, in the optimization based micro network function placement 810, a micro network function at 10:00 is placed at 9:00 only considering control signaling overhead at 10:00.

In FIG. 8, 9:00 is an initial time point and all micro network functions are newly placed. Accordingly, costs of the optimization based micro network function placement 810 and DRL based micro network function placement 820 are the same.

An operation cost of the micro network function may be relatively lower than an installation cost of the micro network function. The installation cost, i.e., a cost for installing the micro network function in a cell edge cloud different from an existing cell edge cloud, may be reduced by placing the micro network function, based on predicted control signaling overhead of a cell.

However, in the optimization based micro network function placement 810, the micro network function is placed in the cell edge cloud, only considering the current control signaling overhead.

Accordingly, the number of micro network functions placed in a cell edge cloud different from an existing cell edge cloud after 9:00 is greater in the optimization based micro network function placement 810 than in the DRL based micro network function placement 820.

On the other hand, in the DRL based micro network function placement 820, a cell edge cloud in which placement of a micro network function is different from current placement is selected based on predicted control signaling overhead of a cell. Accordingly, the cost of the DRL based micro network function placement 820 is lower than the cost of the optimization based micro network function placement 810.

Figure 9:
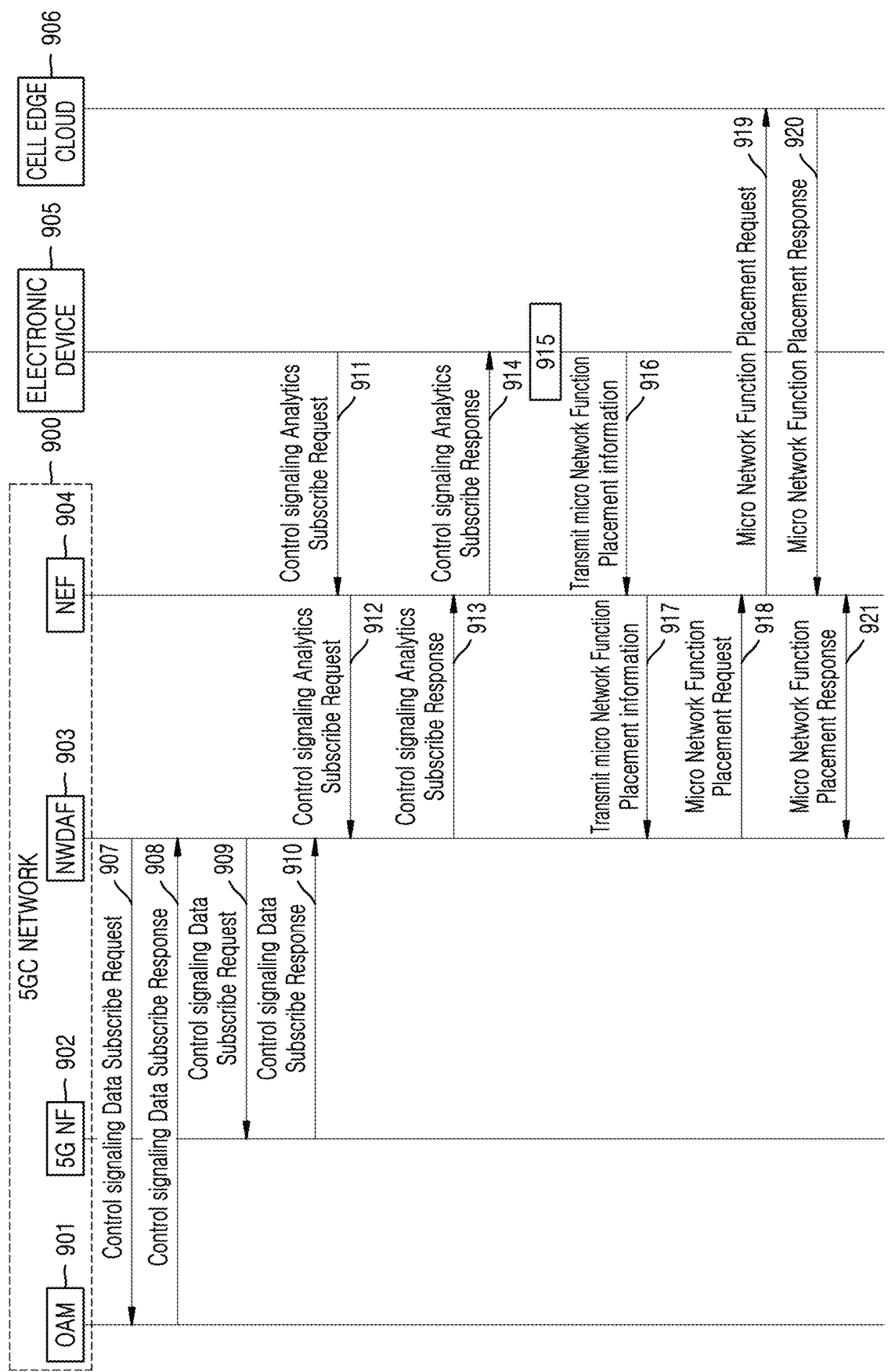
FIG. 9 illustrates a flowchart of procedures by which an electronic device interworks with a 5th generation core (5GC) network, according to an embodiment of the disclosure.

FIG. 9 illustrates a flowchart of procedures by which an electronic device 905 interworks with a 5GC network 900, according to an embodiment of the disclosure.

The 5GC network 900 may include an operations administration and maintenance (OAM) 901, a 5G NF 902, a network data analytics function (NWDAF) 903, and a network exposure function (NEF) 904.

The OAM 901 may process operation, administration, maintenance, provisioning, and troubleshooting of a system. The OAM 901 may be expressed as OA&M, OAM&P, O&M, or OM depending on organizations for standardization or industries.

A wireless communication system defines a new core network, such as a next generation (NG) core network or a 5GC network, while developing from a 4G system to a 5G system. The new core network has generated the 5G NF 902 by virtualizing all existing network entities (NEs). According to an embodiment of the disclosure, the 5G NF 902 may denote a network entity, a network component, or a network resource.

The NWDAF 903 is one of network functions of a 5GC network control plane defined by 3GPP, and may provide a network data collection and analysis function. In detail the NWDAF 903 may analyze data via an intelligence technology, such as machine learning, based on collected network data, and provide a result value of the analysis to the 5G NF 902, thereby optimizing and improving a performance of the 5G NF 902.

The NEF 904 may access information regarding managing of a terminal by the 5GC network 900. For example, the NEF 904 is able to access information regarding subscription to a mobility management event of the terminal, subscription to a session management event of the terminal, a request for session-related information, charging information setting of the terminal, and a request to change a packet data unit (PDU) session policy for the terminal. The NEF 904 transmits information regarding the terminal to the 5G NF 902 by being connected to the 5G NF 902, or externally reports the information regarding the terminal. An application function (AF) is able to use a service and function provided by the 5GC network 900 via the NEF 904.

In operation 907, the NWDAF 903 may transmit, to the OAM 901, a control signaling data subscribe request.

In operation 908, the OAM 901 may transmit, to the NWDAF 903, a control signaling data subscribe response. The control signaling data subscribe response may be approval or rejection.

In operation 909, the NWDAF 903 may transmit, to the 5G NF 902, a control signaling data subscribe request.

In operation 910, the 5G NF 902 may transmit, to the NWDAF 903, a control signaling data subscribe response. When there is an approval response regarding control signaling data subscription of the OAM 901, the control signaling data subscribe response of the 5G NF 902 may be an approval response.

According to an embodiment of the disclosure, the NWDAF 903 may subscribe and collect control signaling data from the 5G NF 902. Also, the NWDAF 903 may analyze the collected control signaling data as control signaling overhead data, connectivity and throughput measurement data of an IoT device, wireless signal strength data of the IoT device, and available resource change data of a cell.

In operation 911, the electronic device 905 may transmit, to the NEF 904, a control signaling analytics subscribe request.

In operation 912, the NEF 904 may transmit, to the NWDAF 903, a control signaling analytics subscribe request.

In operation 913, the NWDAF 903 may transmit, to the NEF 904, a control signaling analytics subscribe response.

In operation 914, the NEF 904 may transmit, to the electronic device 905, a control signaling analytics subscribe response.

In operation 915, the electronic device 905 may determine at least one micro network function used for a service, predict control signaling overhead of at least one cell, based on a history of control signaling overhead of the at least one cell including at least one cell edge cloud 906, and place the at least one micro network function in the at least one cell edge cloud 906, based on the predicted control signaling overhead of the at least one cell.

In operation 916, the electronic device 905 may transmit, to the NEF 904, micro network function placement information.

The micro network function placement information may include not only information about placement of a micro network function, but also a placement cost of the micro network function or control signaling cost information.

According to an embodiment of the disclosure, the placing of the at least one micro network function in the at least one cell edge cloud 906 may include transmitting of the micro network function placement information to the 5GC network 900.

In operation 917, the NEF 904 may transmit, to the NWDAF 903, the micro network function placement information. The NWDAF 903 may determine placement of a micro network function, based on the micro network function placement information transmitted by the NEF 904.

In operation 918, the NWDAF 903 may transmit, to the NEF 904, a micro network function placement request. When the NWDAF 903 does not approve the placement of the micro network function, based on the micro network function placement information transmitted by the NEF 904, the NWDAF 903 may not transmit the micro network function placement request to the NEF 904.

In operation 919, the NEF 904 may transmit, to the cell edge cloud 906, a micro network function placement request. The micro network function is placed in the cell edge cloud 906, based on the micro network function placement information. The cell edge cloud 906 may be included in a cell, and there may be a plurality of cell edge clouds 906.

In operation 920, the cell edge cloud 906 may transmit, to the NEF 904, a micro network function placement response.

In operation 921, the NEF 904 may transmit, to the NWDAF 903, a micro network function placement response.

Figure 10:
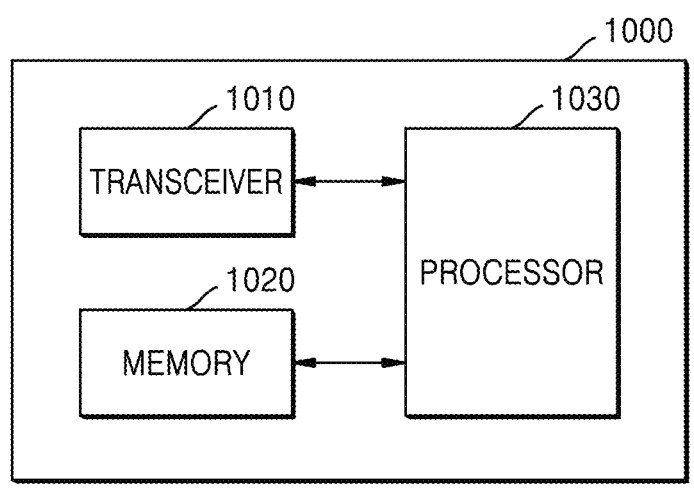
FIG. 10 illustrates a block diagram of an electronic device according to an embodiment of the disclosure.

FIG. 10 illustrates a block diagram of an electronic device 1000 according to an embodiment of the disclosure.

The electronic device 1000 may include a transceiver 1010, a memory 1020, and a processor 1030.

However, the components of the electronic device 1000 are not limited thereto. For example, the electronic device 1000 may be implemented by more or fewer components than those described above. In addition, the processor 1030, the transceiver 1010, and the memory 1020 may be implemented as a single chip.

The transceiver 1010 may transmit and receive a signal to and from an external apparatus, a network (for example, a 3GPP network), or a server (for example, a 5GC). The signal transmitted or received by the transceiver 1010 may include control information and data. The transceiver 1010 may include a radio frequency (RF) transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver. Also, the transceiver 1010 may receive and output, to the processor 1030, a signal through a radio channel, and transmit a signal output from the processor 1030 through the radio channel.

According to an embodiment of the disclosure, the transceiver 1010 may transmit and receive data to and from a terminal, an external server, and a 5GC. For example, the transceiver 1010 may receive a control signaling analytics subscribe response from the terminal, the external server, or the 5GC via a 3GPP network.

According to an embodiment of the disclosure, the transceiver 1010 may transmit and receive data to and from the 5GC, according to control by the processor 1030. For example, the transceiver 1010 may transmit a control signaling analytics subscribe request to the 5GC, receive a control signaling analytics subscribe response from the 5GC, and transmit micro network function placement information to the 5GC.

According to an embodiment of the disclosure, the memory 1020 may store data and a plurality of instructions (or programs) required for operations of the electronic device 1000. Also, the memory 1020 may store control information or data included in a signal transmitted and received by the electronic device 1000. The memory 1020 may be a storage medium, such as read-only memory (ROM), random-access memory (RAM), a hard disk, a CD-ROM, and a DVD, or a combination of storage media. There may be a plurality of the memories 1020. According to an embodiment of the disclosure, the memory 1020 may store instructions for executing, for example, an operation of placing at least one micro network function in at least one cell edge cloud, as described above.

According to an embodiment of the disclosure, the processor 1030 may control a series of processes for the electronic device 1000 to operate according to an embodiment of the disclosure described above. For example, the components of the electronic device 1000 may be controlled such that the electronic device 1000 according to an embodiment of the disclosure places at least one micro network function in at least one cell edge cloud, based on predicted control signaling overhead of at least one cell. There may be a plurality of the processors 1030, and the processor 1030 may execute the plurality of instructions (or programs) stored in the memory 1020 to perform above-described operations, for example, the operation of placing the at least one micro network function in the at least one cell edge cloud. Details thereof have been described above with reference to FIGS. 4 through 9.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in the electronic device 1000. The one or more programs include instructions that enable the electronic device 1000 to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term 'computer program product' or 'computer-readable medium' is used to entirely refer to a medium such as a memory, a hard disk installed in a hard disk drive, or a signal. The 'computer program product' or 'computer-readable medium' provides software configured of instructions for setting a length of a timer for receiving a missing data packet, based on network metrics corresponding to a determined event according to the disclosure, to a computer system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by an electronic device, of placing a micro network function, the method comprising:
   receiving, from a network, information associated with a history of control signaling overhead of at least one cell including at least one cell edge cloud;
   determining at least one micro network function used for a service;
   predicting control signaling overhead of the at least one cell, based on the history of the control signaling overhead of the at least one cell; and
   placing the at least one micro network function in the at least one cell edge cloud, based on the predicted control signaling overhead of the at least one cell; and
   transmitting, to the network, information about placement of the at least one micro network function;
   wherein the at least one cell edge cloud is requested to place the at least one micro network function based on the information about the placement of the at least one micro network function.

2. The method of claim 1, wherein the at least one micro network function comprises at least one of:
   a specific network function (S-NF) used for a specific service; or
   a common network function (C-NF) commonly used for a service.

3. The method of claim 1, wherein the predicting of the control signaling overhead of the at least one cell comprises predicting the control signaling overhead via a control signaling overhead prediction model trained to predict a control signaling overhead, based on a history of the control signaling overhead of the at least one cell according to a placement time interval.

4. The method of claim 1, wherein the placing of the at least one micro network function comprises placing the at least one micro network function, based on at least one of an available resource condition or a latency condition of the at least one cell.

5. The method of claim 1, wherein the placing of the at least one micro network function comprises placing the at least one micro network function, based on a placement cost of the at least one micro network function.

6. The method of claim 5, wherein the placement cost of the at least one micro network function comprises at least one of an installation cost for installing the at least one micro network function in the at least one cell edge cloud or an operation cost for operating the at least one micro network function.

7. The method of claim 1, wherein the placing of the at least one micro network function comprises:
   selecting at least one cell edge cloud in which placement of a micro network function is to be different from current placement; and
   placing the at least one micro network function in the selected at least one cell edge cloud.

8. The method of claim 1, wherein the at least one cell edge cloud comprises at least one Internet of things (IoT) gateway, and
   the placing of the at least one micro network function in the at least one cell edge cloud comprises placing the at least one micro network function in the at least one IoT gateway.

9. The method of claim 1,
   wherein the network is a $5^{th}$ generation core (5GC) network, and
   the method further comprising:
   requesting the 5th generation core (5GC) network for control signaling data analytics comprising the information associated with the history of the control signaling overhead of the at least one cell; and
   receiving the control signaling data analytics from the 5GC network, and
   wherein the predicting of the control signaling overhead of the at least one cell comprises predicting the control signaling overhead of the at least one cell, based on the received control signaling data analytics.

10. An electronic device comprising:
    a memory;
    a transceiver; and
    at least one processor configured to:
    receive, from a network, information associated with a history of control signaling overhead of at least one cell including at least one cell edge cloud;

determine at least one micro network function used for a service;

predict control signaling overhead of the at least one cell, based on the history of the control signaling overhead of the at least one cell;

place the at least one micro network function in the at least one cell edge cloud, based on the predicted control signaling overhead of the at least one cell; and transmit, to the network, information about placement of the at least one micro network function, wherein the at least one cell edge cloud is requested to place the at least one micro network function based on the information about the placement of the at least one micro network function.

11. The electronic device of claim 10, wherein the at least one micro network function comprises at least one of:
   a specific network function (S-NF) used for a specific service; or
   a common network function (C-NF) commonly used for a service.

12. The electronic device of claim 10, wherein the at least one processor is further configured to predict the control signaling overhead via a control signaling overhead prediction model trained to predict a control signaling overhead, based on a history of the control signaling overhead of the at least one cell according to a placement time interval.

13. The electronic device of claim 10, wherein the at least one processor is further configured to place the at least one micro network function, based on at least one of an available resource condition or a latency condition of the at least one cell.

14. The electronic device of claim 10, wherein the at least one processor is further configured to place the at least one micro network function, based on a placement cost of the at least one micro network function.

15. The electronic device of claim 14, wherein the placement cost of the at least one micro network function comprises at least one of an installation cost for installing the at least one micro network function in the at least one cell edge cloud or an operation cost for operating the at least one micro network function.

16. The electronic device of claim 10, wherein the at least one processor is further configured to:
   select at least one cell edge cloud in which placement of a micro network function is to be different from current placement; and
   place the at least one micro network function in the selected at least one cell edge cloud.

17. The electronic device of claim 10, wherein the at least one cell edge cloud comprises at least one Internet of things (IoT) gateway, and
   the at least one processor is further configured to place the at least one micro network function in the at least one IoT gateway.

18. The electronic device of claim 10,
   wherein the network is a $5^{th}$ generation core (5GC) network, and
   wherein the at least one processor is further configured to:
   request the 5th generation core (5GC) network for control signaling data analytics comprising the information associated with the history of the control signaling overhead of the at least one cell;
   receive the control signaling data analytics from the 5GC network; and
   predict the control signaling overhead of the at least one cell, based on the received control signaling data analytics.

19. A non-transitory computer-readable medium having recorded thereon a program that, when executed by a processor, causes the processor to:
   receive, from a network, information associated with a history of control signaling overhead of at least one cell including at least one cell edge cloud,
   determine at least one micro network function used for a service;
   predict control signaling overhead of the least one cell, based on the history of the control signaling overhead of the at least one cell;
   place the at least one micro network function in the at least one cell edge cloud, based on the predicted control signaling overhead of the at least one cell; and
   transmit, to the network, information about placement of the at least one micro network function,
   wherein the at least one cell edge cloud is requested to place the at least one micro network function based on the information about the placement of the at least one micro network function.

20. The non-transitory computer readable medium of claim 19, wherein to predict the control signaling overhead of the at least one cell, the program, when executed by the processor, causes the processor to:
   predict the control signaling overhead via a control signaling overhead prediction model trained to predict a control signaling overhead, based on a history of the control signaling overhead of the at least one cell according to a placement time interval.

* * * * *